United States Patent Office 2,813,116
Patented Nov. 12, 1957

2,813,116

PREPARATION OF COMPOUNDS HAVING A TRI-CYANOVINYL SUBSTITUENT ON A CARBON ATOM, AND NEW TRICYANOVINYL-SUBSTITUTED HYDROCARBON PRODUCTS

George N. Sausen, Wilmington, Del., assignor to E. I. du Pont de Nemours and Company, Wilmington, Del., a corporation of Delaware No Drawing. Application April 15, 1955,
Serial No. 501,719

9 Claims. (Cl. 260—465)

This invention is concerned with the preparation of tricyanovinyl compounds and is particularly concerned with new tricyanovinyl-substituted hydrocarbons and their preparation.

Compounds having an $\alpha,\beta,\beta$-tricyanovinyl substituent on a carbon atom, which will be referred to herein as C-tricyanovinyl compounds, can be prepared by the reaction of tetracyanoethylene with many aromatic amines or by oxidation of $\alpha,\beta,\beta$-tricyanoethyl auxochrome-substituted aromatic compounds. These processes have disadvantages, such as difficulty in preparing the required intermediates or in not being applicable to the preparation of certain classes of compounds, particularly those in which the C-tricyanovinyl substituent is attached to a hydrocarbon.

It is an object of this invention to provide an economical process for preparing C-tricyanovinyl compounds. Another object is to provide a process for preparing new C-tricyanovinyl hydrocarbons. A further object is to provide a new class of C-tricyanovinyl compounds. Other objects will become apparent from the following specification and claims.

There has now been discovered a process for the preparation of C-tricyanovinyl compounds by the reaction of malononitrile with an acyl cyanide in which the alpha carbon atom of the acyl group has all four valence bonds attached to carbon, either directly or through oxygen, sulfur or nitrogen. This new process represents a method for the preparation of a new class of C-tricyanovinyl compounds, viz., those in which the tricyanovinyl group is attached to a hydrocarbon radical in which the carbon atom carrying the tricyanovinyl group is attached only to carbon.

The process of this invention can be expressed by the following equation:

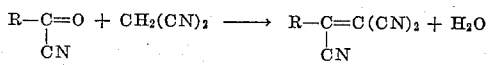

wherein R is an organic group of 4 to 12 or more carbon atoms, with its bond stemming from a carbon atom having its remaining valences attached only to members of the group consisting of carbon, carbon attached through an oxygen atom, carbon attached through a sulfur atom, and carbon attached through a nitrogen atom. R may be an unsubstituted hydrocarbon or a hydrocarbon having amine and/or halogen substituents. Compounds in which R differs only in that its bond stems from a carbon atom attached to an oxygen, sulfur or nitrogen, atom which in turn is attached to a hydrocarbon radical, e. g., contains an alkoxy, aryloxy, alkylmercapto, alkylsulfinyl, alkylsulfonyl, arylmercapto, arylsulfinyl, arylsulfonyl, secondary amino or tertiary amino substituent or a furan, thiophene, pyrrole or pyridine ring, are equivalent to the above for the purposes of this invention.

For practical yields of product within a reasonable time in the reaction of an acyl cyanide with malononitrile to produce C-tricyanovinyl compounds according to this invention, the use of a catalyst which comprises a salt of a basic nitrogen compound and an acid is preferred. A particularly useful group of catalysts are amine (including ammonium) salts employed in the presence of an acid, i. e., an excess of acid over the amount required to form the amine salt. Such a catalyst can be prepared in situ by neutralizing an amine with a molecular excess of acid, or an amine salt and an acid may be added separately, in which case the free acid may be different from the one employed to prepare the amine salt. A particularly preferred group of acids for this purpose are those water-soluble acids which form 0.1 normal aqueous solutions having a pH not greater than 4.0.

In a preferred embodiment of this invention a mixture consisting of malononitrile, a molar excess of an acyl cyanide, an amine salt, and an acid is heated in a water-immiscible organic solvent which is inert to the reactants. The use of a molecular excess of acyl cyanide is not essential but represents a convenience in avoiding the necessity of removing excess malononitrile at the end of the reaction. The use of a water-immiscible organic solvent permits more rapid completion of the reaction by providing for continuous separation and removal of water from the refluxing condensate as it is formed. When the reaction is complete (i. e., when no more water is formed), the solvent and excess acyl cyanide are removed by distillation. The amine salt and acid of the catalyst are removed by washing with water, and the crude tricyanovinyl compound remaining is purified by recrystallization from an organic solvent.

In the following examples, which illustrate embodiments of the invention, parts are by weight.

Example I

A solution of 1320 parts of benzoyl cyanide, 660 parts of malononitrile, 10 parts of $\beta$-alanine, and 210 parts of glacial acetic acid in 2638 parts of benzene is heated under reflux and the water formed is removed by azeotropic distillation through a continuous water separator. After three hours an additional 10 parts of $\beta$-alanine is added to the solution and the reaction is continued. After an additional 23 hours 50 parts of piperidine and 52 parts of glacial acetic acid are added to the solution and the reaction is continued for an additional seven and one-quarter hours (total time of thirty hours). The solution is cooled, washed with water and dried over anhydrous magnesium sulfate. The benzene is removed by distillation at atmospheric pressure, and distillation at reduced pressure removes 590 parts of recovered benzoyl cyanide, leaving a black residue of 380 parts. Recrystallization of this residue from cyclohexane (using activated carbon) gives 217 parts (12.1% conversion) of tricyanovinylbenzene in the form of yellow needles, M. P. 97.5–99° C. Repeated recrystallization from cyclohexane gives tricyanovinylbenzene in the form of yellow needles, M. P. 98.5–99° C. The light absorption spectrum of a chloroform solution of this material shows a primary maximum at 343 millimicrons (molecular extinction coefficient 16,580) and a secondary peak at 244 millimicrons (molecular extinction coefficient 5940).

*Analysis.*—Calc'd for $C_{11}H_5N_3$: C, 73.73; H, 2.81; N, 23.45, M. W. 179. Found: C, 73.02, 73.35; H, 2.84, 2.98; N, 23.64, M. W. 192; N, 23.44, M. W. 188.

Example II

A solution of 14,900 parts of benzoyl cyanide, 500 parts of malononitrile, 66 parts of piperidine, and 236 parts of acetic acid in 4400 parts of benzene is heated to reflux and the water formed is removed by azeotropic distillation through a continuous water separator. After 41 hours the solution is cooled, washed with water, and dried over anhydrous magnesium sulfate. Benzene is removed by distillation at atmospheric pressure, and 11,700 parts of excess benzoyl cyanide is removed by distillation at reduced pressure. The residue comprises 2060 parts of crude tricyanovinylbenzene. Recrystallization of this material three times from cyclohexane using activated carbon gives 494 parts (36%) of tricyanovinylbenzene, M. P. 97–99.5° C. Repeated recrystallization from cyclohexane or a benzene-hexane mixture yields yellow needles of tricyanovinylbenzene melting at 98.5–99° C.

This example is repeated using ammonium acetate and acetic acid in place of piperidine and acetic acid. A comparable yield of tricyanovinylbenzene is obtained.

*Example III*

A solution of 2500 parts of benzoyl cyanide, 500 parts of malononitrile, 66 parts of piperidine, and 380 parts of concentrated sulfuric acid in 4400 parts of benzene is heated under reflux and the water formed is removed by azeotropic distillation through a continuous water separator. After 23 hours 150 parts of water has separated. The solution is cooled, washed with water and dried over anhydrous magnesium sulfate. The benzene is removed by distillation at atmospheric pressure, and distillation at reduced pressure gives 1780 parts of recovered benzoyl cyanide and a black residue which solidifies on standing. Recrystallization of the residue from cyclohexane (using activated carbon) gives 206 parts (15.2% conversion) of yellow needles of tricyanovinylbenzene, M. P. 94.5–99° C. The identity of the sample is shown by mixed melting point comparison with the product of Example I.

Example III is repeated with the sulfuric acid replaced with 393 parts of concentrated hydrochloric acid. One hundred and eighteen parts (56.5% conversion based on hydrochloric acid) of ammonium chloride separates from solution during the course of the reaction. The black semi-solid residue which is obtained after removal of the benzene and benzoyl cyanide from the reaction mixture is sublimed at reduced pressure. From the sublimate is obtained benzoic acid (identified by mixed melting point comparison with an authentic sample) and tricyanovinylbenzene (identified after recrystallization by mixed melting point comparison with the product of Example I).

Example III is again repeated using 215 parts of 85% formic acid in place of the sulfuric acid and the reaction carried out as before. A black semi-solid residue of 440 parts is obtained after removal of the benzene and benzoyl cyanide from the reaction mixture. Recrystallization of this residue from cyclohexane yields tricyanovinylbenzene.

*Example IV*

A solution of 1400 parts of trimethylacetyl cyanide (Sperber and Fricano, J. Am. Chem. Soc. 72, 2792 (1950)), 793 parts of malononitrile, 103 parts of piperidine, and 367 parts of glacial acetic acid in 6596 parts of benzene is heated under reflux and the water formed is removed by azeotropic distillation through a continuous water separator. After 30 hours an additional 195 parts of trimethylacetyl cyanide in 132 parts of benzene is added to the reaction mixture and refluxing is continued for 24 hours. The solution is cooled, washed with water, and dried over anhydrous magnesium sulfate. Benzene and most of the excess trimethylacetyl cyanide is removed by distillation at atmospheric pressure. Further distillation at reduced pressure gives 458 parts of a fraction boiling at 120–127° C. at 14 mm. Examination of this material by elementary analysis and ultraviolet absorption shows it to consist of approximately 30% trimethylacetyl cyanide and 70% tert.-butyltricyanoethylene. This compound may be alternately named 3,3-dimethyl-1,1,2-tricyano-1-butene or 2-methyl-2-tricyanovinylpropane. Recrystallization of this material from hexane gives 249 parts (13%) of white plates melting at 77–78° C. Repeated recrystallization from hexane gives tert.-butyltricyanoethylene as white plates melting at 77.5–78° C. The light absorption spectrum of an ethanol solution of this compound shows a maximum at 251 millimicrons (molecular extinction coefficient 11,280).

*Analysis.*—Calc'd for $C_9H_9N_3$: C, 67.90; H, 5.70; N, 26.40, M. W. 159. Found: C, 67.91; H, 5.73; N, 26.47, M. W. 172; N, 26.21, M. W. 177.

*Example V*

A solution of 806 parts of p-methoxybenzoyl cyanide (Marsh and Stephen, J. Chem. Soc. 1633 (1925)), 330 parts of malononitrile, 40 parts of piperidine, and 150 parts of glacial acetic acid in 2160 parts of toluene is heated under reflux and the water formed is removed by azeotropic distillation through a continuous water separator. After 19 hours the solution is cooled, washed with water, and dried over anhydrous magnesium sulfate. Toluene is removed by distillation at atmospheric pressure and excess p-methoxybenzoyl cyanide is removed by distillation at reduced pressure. Recrystallization of the pot residue from a mixture of benzene and hexane gives 66 parts (6.3%) of crude 4-($\alpha,\beta,\beta$-tricyanovinyl)anisole melting at 106–115° C. Recrystallization of this product from cyclohexane, followed by sublimation, gives 4-($\alpha,\beta,\beta$-tricyanovinyl)anisole in the form of yellow prisms melting at 122.5–123.5° C. (with previous softening). The light absorption spectrum of this compound in chloroform shows a maximum at 407 millimicrons (molecular extinction coefficient 25,400) with a secondary peak at 258 millimicrons (molecular extinction coefficient 9000).

*Analysis.*—Calc'd for $C_{12}H_7ON_3$: C, 68.89; H, 3.37; N, 20.09, M. W. 209. Found: C, 69.56; H, 3.36; N, 20.24, M. W. 215; N, 19.94, M. W. 210.

Example V is repeated using p-ethoxybenzoyl cyanide (Vorländer, Ber. 44, 2463 (1911)) in place of p-methoxybenzoyl cyanide. There is obtained 4-($\alpha,\beta,\beta$-tricyanovinyl)phenetole.

*Example VI*

A solution of 2420 parts of furoyl cyanide (Fischer and Brauns, Ber. 46, 892 (1913), 1320 parts of malononitrile, 20 parts of $\beta$-alanine, and 420 parts of glacial acetic acid in 5280 parts of benzene is heated under reflux and the water formed is removed by azeotropic distillation through a continuous water separator. The solution is heated for a total of 31 hours, during which time 30 parts of water separates and the solution turns black in color. The solution is washed with water and dried over anhydrous magnesium sulfate. Benzene is removed by distillation at atmospheric pressure and excess furoyl cyanide (1340 parts) is removed by distillation at 11 mm. pressure. The residue is 340 parts which is extracted with cyclohexane in a Soxhlet apparatus to give two crops of crude 2-($\alpha,\beta,\beta$-tricyanovinyl)furan. The first crop of 45 parts melts at 133–143° C. and the second crop of 183 parts melts at 143–146.5° C. The crops are combined and recrystallized from carbon tetrachloride to give 144 parts (4.3%) of 2-($\alpha,\beta,\beta$-tricyanovinyl)furan in the form of yellow needles melting at 145.5–146° C. Further treatment by sublimation yields the compound in the form of deep yellow needles melting at 145.5–146° C. The light absorption spectrum of an ethanol solution of this compound shows a maximum at 379 millimicrons (molecular extinction coefficient 21,900) and two secondary peaks, one at 215 millimicrons (molecular extinction coefficient 9090) and the other at 270 millimicrons (molecular extinction coefficient 4260). The light absorption spectrum of a chloroform solution of this compound shows a maximum at 383 millimicrons (molecular extinction coefficient 25,150) with a secondary peak at 273 millimicrons (molecular extinction coefficient 4120).

*Analysis.*—Calc'd for $C_9H_3ON_3$: C, 63.91; H, 1.79; N, 24.84, M. W. 169. Found: C, 63.98; H, 1.98; N, 24.56, M. W. 168; N, 24.43, M. W. 169.

Example II is repeated using the following cyanides in place of benzoyl cyanide and the indicated tricyanovinyl compounds are obtained.

| Acyl Cyanide | Tricyanovinyl Compound |
|---|---|
| α-Naphthoyl Cyanide | αTricyanovinylnaphthalene. |
| p-Phenoxybenzoyl Cyanide | 1-Phenoxy-4-(α,β,β-tricyanovinyl)benzene. |
| Ethoxypivaloyl Cyanide | (2-Tricyanovinyl-2-methylpropyl) ethyl ether. |
| Methacryloyl Cyanide | 1-Tricyanovinyl-1-methylethylene or alternatively named 3-Methyl-1,1,2-tricyanobutadiene. |
| p-Chlorobenzoyl Cyanide | p-Chlorotricyanovinylbenzene. |
| p-Dimethylaminobenzoyl Cyanide | p-Dimethylaminotricyanovinylbenzene. |
| p-Diethylaminobenzoyl Cyanide | p-Diethylaminotricyanovinylbenzene. |
| Phenylpropioloyl Cyanide | Phenyltricyanovinylacetylene. |
| α-Ethoxyisobutyroyl Cyanide | 2-Ethoxy-2-tricyanovinylpropane. |
| α-Phenoxyisobutyroyl Cyanide | 2-Phenoxy-2-tricyanovinylpropane. |
| α-Methylmercaptoisobutyroyl Cyanide. | 2-Methylmercapto-2-tricyanovinylpropane. |
| α-Ethylsulfonylisobutyroyl Cyanide. | 2-Ethylsulfonyl-2-tricyanovinylpropane. |
| α-Phenylmercaptoisobutyroyl Cyanide. | 2-Phenylmercapto-2-tricyanovinylpropane. |
| α-Phenylsulfonylisobutyroyl Cyanide. | 2-Phenylsulfonyl-2-tricyanovinylpropane. |
| α-Benzylsulfinylisobutyroyl Cyanide. | 2-Benzylsulfinyl-2-tricyanovinylpropane. |
| α-(N-Methylamino)isobutyroyl Cyanide. | 2-(N-Methylamino)-2-tricyanovinylpropane. |
| α-(N,N-Dimethylamino)isobutyroyl Cyanide. | 2-(N,N-Dimethylamino)-2-tricyanovinylpropane. |
| 2-Pyrroyl Cyanide | 2-Tricyanovinylpyrrole. |
| α-Pyridinecarbonyl Cyanide | 2-Tricyanovinylpyridine. |
| 2-Thenoyl Cyanide | 2-Tricyanovinylthiophene. |

The acyl cyanides shown above are prepared from the corresponding acids by conversion to the acid halide followed by treatment with cuprous cyanide or with pyridine and hydrogen cyanide. These conversions are shown by Wagner and Zook, "Synthetic Organic Chemistry," John Wiley and Sons, Inc., New York, 1953, Method 335 (p. 546) and Method 381 (p. 595). α-Napthoyl cyanide was prepared as disclosed by Boessneck, Ber. 15, 3064 (1882).

In the process of the present invention, malononitrile reacts with a molecular equivalent of the acyl cyanide. This is true whether the reaction mixture contains molecular equivalents of the two or an excess of the one or the other. However, it has been found that the highest yields of tricyanovinyl compounds are obtained and their purification is most readily effected when a molecular excess of the acyl cyanide is used. Since the excess of acyl cyanide is readily recovered for reuse, in large-scale repeated operation the advantages of this procedure are obtained with no overall loss of starting material.

The process of the present invention may be carried out in the absence of an added solvent by mixing the reactants and letting the mixture stand. However, it is preferred to use an added solvent which is inert to the reactants and to operate at temperatures above room temperature. Thus, the reaction may be carried out at the refluxing temperature of such solvents as dioxane. As has been previously indicated, the preferred group of solvents for carrying out this reaction are the water-immiscible inert solvents, such as the ethers, hydrocarbons and halogenated hydrocarbons, i. e., diethyl ether, diisopropyl ether, chloroform, carbon tetrachloride, hexane, cyclohexane, benzene, toluene, the xylenes, bromobenzene, the chlorotoluenes, and the like. When a water-immiscible solvent is used and the mixture is heated at reflux temperature during the reaction, it is expedient to separate the water from the liquid continuously as it returns to the reactor, thereby shortening the time required for completion of the reaction as well as providing a means of observing the progress of the reaction by measuring the amount of water given off.

The temperature for carrying out this reaction may be varied within wide limits, from room temperature and below to temperatures in excess of 200° C. which may be obtained by operating in a closed system under autogenous pressure. The refluxing temperatures of the preferred solvents at atmospheric pressure represent a practical temperature range for carrying out the reaction and the temperature range of 50–150° C. is therefore preferred. Pressure is not a critical factor in this reaction.

Suitable catalysts for the process of this invention comprise a combination of an ammonium or amine salt with an acid. The examples show the use of ammonium acetate with acetic acid, piperidine acetate with acetic acid, β-alanine acetate with acetic acid, piperidine sulfate with sulfuric acid, piperidine hydrochloride with hydrochloric acid, and piperidine formate with formic acid. Other amine salts may be used, such as diethylamine hydrochloride, 2,5-diaminotoluene sulfate, aniline hydrochloride, aniline hydrobromide, 2-bromo-5-diethylaminopentane hydrobromide, s-dimethyl-p-phenylenediamine dioxalate, and gylcine ethyl ester hydrochloride in conjunction with acids such as nitric, phosphoric, sulfuric, sulfurous, oxalic, tartaric, malic, citric, lactic, benzoic, and the like.

The effect of the catalyst combination is observable when the amine salt is present in amount equivalent to one mole percent based on the malononitrile employed in the reaction. Maximum effect of the catalyst is observable when the amine salt is present in amount equivalent to about ten mole percent of the malononitrile employed (assuming an excess of acyl cyanide). Excesses of amine salt over ten mole percent of the malononitrile may be used but possess no particular advantage.

The amount of acid used in conjunction with the amine salt in the catalyst may be varied over wide limits. For example, acid in an amount equivalent to one mole percent of the amine salt may be used. However, it is preferred to employ the acid in amounts ranging from roughly equivalent to the amount of amine salt to two equivalents of acid based on the amine salt. Higher excesses of acid may be employed but show no particular advantage.

The tricyanovinyl compounds of the present invention are potent sources of hydrogen cyanide and, as such, are highly useful as insecticides. When heated with moist alkali as in processes adaptable for fumigation, these tricyanovinyl compounds generate hydrogen cyanide rapidly. When deposited from a faintly alkaline medium (pH 7–9) as by spraying of plants or in insect nests, these tricyanovinyl compounds decompose slowly and give off hydrogen cyanide, thereby serving as effective insect poisons over extended periods of time.

The tricyanovinyl compounds in which the tricyanovinyl group is attached to a carbon atom in a cyclic structure of aromatic character are colored materials and are useful as dyes. For example, even tricyanovinylbenzene, the simplest member of this group, is useful as a yellow dye. This is illustrated as follows:

To a solution of 15 mg. of a synthetic detergent and two drops of acetic acid in 50 ml. of water is added a solution of 15 mg. of tricyanovinylbenzene in 2 ml. of Cellosolve. A 1-g. sample of wool cloth is swirled and heated under reflux in this solution for one hour. The cloth is dyed a light tan by this procedure.

Since many different embodiments of the invention may be made without departing from the spirit and scope thereof, it is to be understood that the invention is not limited by the specific illustrations except to the extent defined in the following claims.

What is claimed is:

1. The process for preparing a C-tricyanovinyl compound which comprises reacting malononitrile with an acyl cyanide in which the alpha carbon attached to the carbonyl cyanide radical has its remaining valences attached solely to members of the group consisting of carbon, carbon attached through an oxygen atom, carbon attached through a sulfur atom and carbon attached through a nitrogen atom.

2. A process as defined in claim 1 in which the reaction is catalyzed by a combination of a salt of a basic nitrogen compound and an acid.

3. A process as defined in claim 2 in which the acyl cyanide is used in molecular excess.

4. A process as defined in claim 2 in which the reaction is carried out in an inert solvent.

5. A process as defined in claim 2 in which the reaction is carried out in a water-immiscible inert solvent at a temperature in the range of 50° to 150° C.

6. A process as defined in claim 2 in which the catalyst comprises an acid and a salt selected from the group consisting of ammonium salts and amine salts.

7. A process as defined in claim 2 in which the catalyst comprises at least 1 mol percent based on the malononitrile of an amine salt and at least an equivalent amount of acid.

8. A process as defined in claim 2 in which the acid is a water-soluble acid which forms a 0.1 normal aqueous solution having a pH value not greater than 4.0.

9. A C-tricyanovinyl compound of the formula $$R-\underset{\underset{CN}{|}}{C}=C(CN)_2$$

wherein R is a hydrocarbon group, the tricyanovinyl group being attached to a carbon atom which is attached directly to carbon only.

References Cited in the file of this patent
UNITED STATES PATENTS 2,541,350   Gilbert _____ Feb. 13, 1951
2,721,799   Edwards et al. _____ Oct. 25, 1955

OTHER REFERENCES

Migridichian: The Chemistry of Organic Cyanogen Compounds. (1947), p. 329.